United States Patent
Kraus et al.

(10) Patent No.: US 11,580,037 B2
(45) Date of Patent: Feb. 14, 2023

(54) PRIVILEGE LEVEL ASSIGNMENTS TO GROUPS

(71) Applicant: Microsoft Technology Licensing, LLC, Redmond, WA (US)

(72) Inventors: Naama Kraus, Haifa (IL); Moshe Israel, Ramat-Gan (IL); Tamer Salman, Haifa (IL); Moshe Shalala, Rishon Lezion (IL); Rotem Lurie, Tel Aviv (IL); Avihai Dvir, Bruchin (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 210 days.

(21) Appl. No.: 16/907,026

(22) Filed: Jun. 19, 2020

(65) Prior Publication Data
US 2021/0397565 A1    Dec. 23, 2021

(51) Int. Cl.
| G06F 12/00 | (2006.01) |
| G06F 13/00 | (2006.01) |
| G06F 12/14 | (2006.01) |
| G06F 9/455 | (2018.01) |
| G06F 9/46  | (2006.01) |
| G06F 21/62 | (2013.01) |

(52) U.S. Cl.
CPC ...... *G06F 12/1491* (2013.01); *G06F 9/45533* (2013.01); *G06F 9/468* (2013.01); *G06F 21/6218* (2013.01); *G06F 2221/2141* (2013.01)

(58) Field of Classification Search
CPC .. G06F 9/45533; G06F 9/468; G06F 12/1491; G06F 21/6218; G06F 2221/2141
See application file for complete search history.

(56) References Cited

U.S. PATENT DOCUMENTS 6,119,188 A * 9/2000 Sheafor ............... G06F 13/362
710/240
6,330,603 B1 * 12/2001 Seki .................. H04L 47/745
709/226

(Continued)

FOREIGN PATENT DOCUMENTS

| EP | 3567506 A1 | 11/2019 |
| WO | 2021029950 A1 | 2/2021 |

OTHER PUBLICATIONS

"15 Top Cloud Computing Service Provider Companies", Retrieved from: https://web.archive.org/web/*/https://www.softwaretestinghelp.com/cloud-computing-service-providers/, Apr. 20, 2020, 14 pages.

(Continued)

*Primary Examiner* — Sheng Jen Tsai
(74) *Attorney, Agent, or Firm* — Mannava & Kang, P.C.

(57) ABSTRACT

According to examples, an apparatus may include a memory on which is stored machine-readable instructions that may cause a processor to determine, for each of a plurality of members in a group, a respective least privilege level for a resource and determine, based on the determined respective least privilege levels, a privilege level to be assigned to the group for the resource. The instructions may also cause the processor to assign the determined privilege level to the group for the resource and apply the assigned privilege level to the members of the group for the resource.

17 Claims, 7 Drawing Sheets

(56) References Cited

U.S. PATENT DOCUMENTS

| | | | | |
|---|---|---|---|---|
| 6,665,760 | B1* | 12/2003 | Dotson | G06F 13/30 |
| | | | | 710/240 |
| 6,775,781 | B1* | 8/2004 | Phillips | G06F 21/33 |
| | | | | 726/4 |
| 6,883,132 | B1* | 4/2005 | Dotson | H03M 13/09 |
| | | | | 714/774 |
| 7,082,315 | B2* | 7/2006 | Bar-On | H04W 4/08 |
| | | | | 455/518 |
| 10,116,679 | B1* | 10/2018 | Wu | H04L 63/102 |
| 10,313,196 | B2* | 6/2019 | Vibhor | H04W 4/50 |
| 10,908,909 | B2* | 2/2021 | Moudgill | G06F 9/48 |
| 10,992,744 | B1* | 4/2021 | Kutuzov | H04L 67/322 |
| 11,115,873 | B1* | 9/2021 | Smith | H04W 28/24 |
| 2001/0033557 | A1* | 10/2001 | Amalfitano | H04L 41/0896 |
| | | | | 370/335 |
| 2003/0137536 | A1* | 7/2003 | Hugh | G06F 16/273 |
| | | | | 715/744 |
| 2003/0227487 | A1* | 12/2003 | Hugh | G06F 16/9024 |
| | | | | 707/E17.011 |
| 2005/0198512 | A1* | 9/2005 | Kline | G06F 21/604 |
| | | | | 713/182 |
| 2005/0271048 | A1* | 12/2005 | Casey | H04L 47/808 |
| | | | | 370/389 |
| 2006/0117130 | A1* | 6/2006 | Tsushima | G06F 9/45558 |
| | | | | 711/6 |
| 2010/0091724 | A1* | 4/2010 | Ishii | H04W 52/32 |
| | | | | 370/329 |
| 2011/0231536 | A1* | 9/2011 | Tanaka | H04L 67/104 |
| | | | | 709/223 |
| 2014/0359692 | A1* | 12/2014 | Chari | G06F 21/31 |
| | | | | 726/1 |
| 2015/0189114 | A1* | 7/2015 | Hayakawa | H04N 1/00915 |
| | | | | 358/1.13 |
| 2015/0310188 | A1* | 10/2015 | Ford | G06F 21/10 |
| | | | | 726/28 |
| 2016/0080920 | A1* | 3/2016 | Baghel | H04W 72/02 |
| | | | | 455/404.1 |
| 2017/0041296 | A1* | 2/2017 | Ford | G06F 16/951 |
| 2017/0337091 | A1* | 11/2017 | Liu | H04L 67/12 |
| 2018/0351888 | A1* | 12/2018 | Howard | H04L 51/36 |
| 2018/0359654 | A1* | 12/2018 | McDonald | H04W 4/08 |
| 2020/0257639 | A1* | 8/2020 | Chamarty | G06F 12/0811 |
| 2021/0075795 | A1* | 3/2021 | Liu | H04L 63/083 |
| 2021/0409419 | A1* | 12/2021 | Kraus | H04L 63/105 |

OTHER PUBLICATIONS

"Moving Average", Retrieved from: https://en.wikipedia.org/wiki/Moving_average, Jun. 6, 2020, 12 Pages.

"Principle of Least Privilege", Retrieved from: https://en.wikipedia.org/wiki/Principle_of_least_privilege, Apr. 14, 2020, 5 Pages.

Kerner, Sean Michael, "Top Cloud Security Companies", Retrieved from: https://www.esecurityplanet.com/products/cloud-security-companies.html, Jan. 29, 2020, 6 Pages.

Wike, et al., "List Members", Retrieved from: https://docs.microsoft.com/en-us/graph/api/group-list-members?view=graph-rest-1.0&tabs=http, May 21, 2020, 3 Pages.

Wike, et al., "List Group Transitive Members", Retrieved from: https://docs.microsoft.com/en-us/graph/api/group-list-transitivemembers?view=graph-rest-1.0&tabs=http, May 19, 2020, 3 pages.

"International Search Report and Written Opinion Issued in PCT Application No. PCT/US21/026292", dated Jun. 2, 2021, 12 Pages.

* cited by examiner

PRIVILEGE LEVEL ASSIGNMENTS TO GROUPS

BACKGROUND

Cloud providers may provide users access to a variety of resources, which may be shared among many users. In order to provide secure access, guarantee privacy, and adhere to legal and compliance regulations, cloud providers may implement access models that may allow for organizational administrators to apply restrictions on resource access. For instance, cloud providers may employ a Rule Based Access Control (RBAC) as an access model for the users over the resources.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
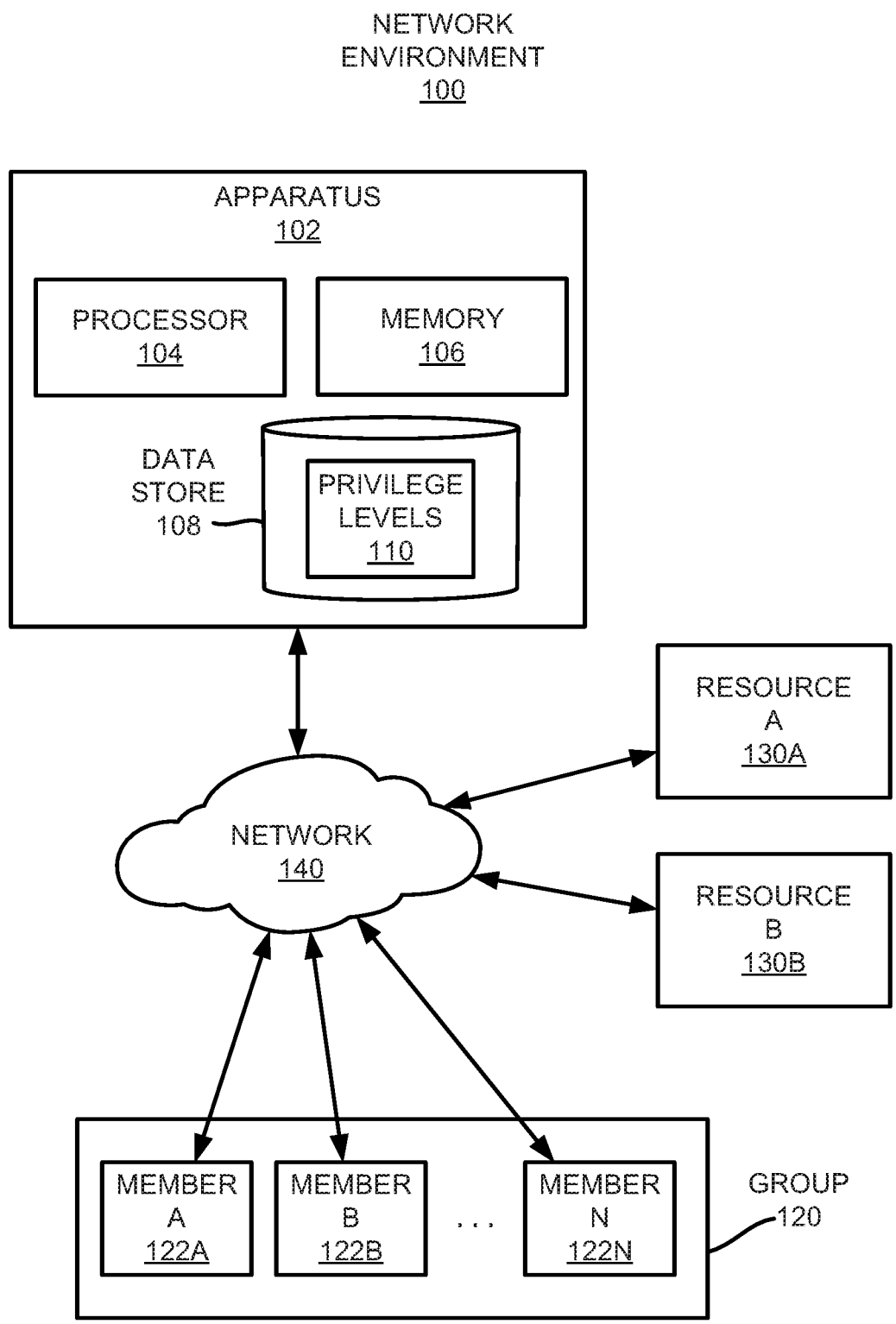
FIG. 1 shows a block diagram of a network environment, in which an apparatus may manage privilege levels assigned to a group of members, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

As discussed above, cloud providers may provide users access to a variety of resources and may implement an access model that may restrict access by the users to the resources. As organizations become more complex with ever increasing numbers of users and resources, the ability to apply the access model and track access configurations may become more complex. In some instances, this may lead to some of the users being granted greater access privileges to the resources than they may practically use. A result of the users being granted overly permissive access privileges may be that the access to the resources may be less secure than when the users are granted least levels of access privileges.

Disclosed herein are systems, apparatuses, methods, and computer-readable media in which a processor may manage assignment of privilege levels to groups of members for resources. That is, instead of assigning privilege levels to members individually for the resources, the processor may assign privilege levels to groups of members for the resources. In addition, the processor may assign the privilege level to a group of members such that the members may have a least privilege level to a resource. The least privilege level may be defined as a minimal level of access privilege that the members may use to perform their intended functions with respect to the resource.

As discussed herein, the processor may determine a respective least privilege level for a resource for each of a plurality of members in a group and may determine, based on the determined respective least privilege levels, a privilege level to be assigned to the group for the resource. The processor may also assign the determined privilege level to the group for the resource and may apply the assigned privilege level to the members of the group for the resource. In some examples, the processor may further assign and apply different privilege levels to some of the members, may partition the group into sub-groups that are assigned different privilege levels with respect to each other, and/or may modify the assigned privilege level.

A technological issue with conventional management of user access to resources may be that the tracking of individual user privilege levels may be overly complex, which may result in greater processor usage and decreased security over data in the resources. Through implementation of various features of the present disclosure, a processor may assign a privilege level to a group of members instead of to the members individually for a resource. In addition, the processor may assign the privilege level to be a least privilege level that, for instance, the majority of the members in the group may use to access the resource in normally performing their duties. As a result, a technological improvement of the features of the present disclosure may be that the complexity in managing member privileges over the resources may be reduced, which may result in a reduced processor utilization and thus, energy and processing power consumption. Additionally, the features of the present disclosure may result in improved security over the resources as the groups (and thus, the members of the groups) may be assigned least privilege levels to the resources.

Figure 2:
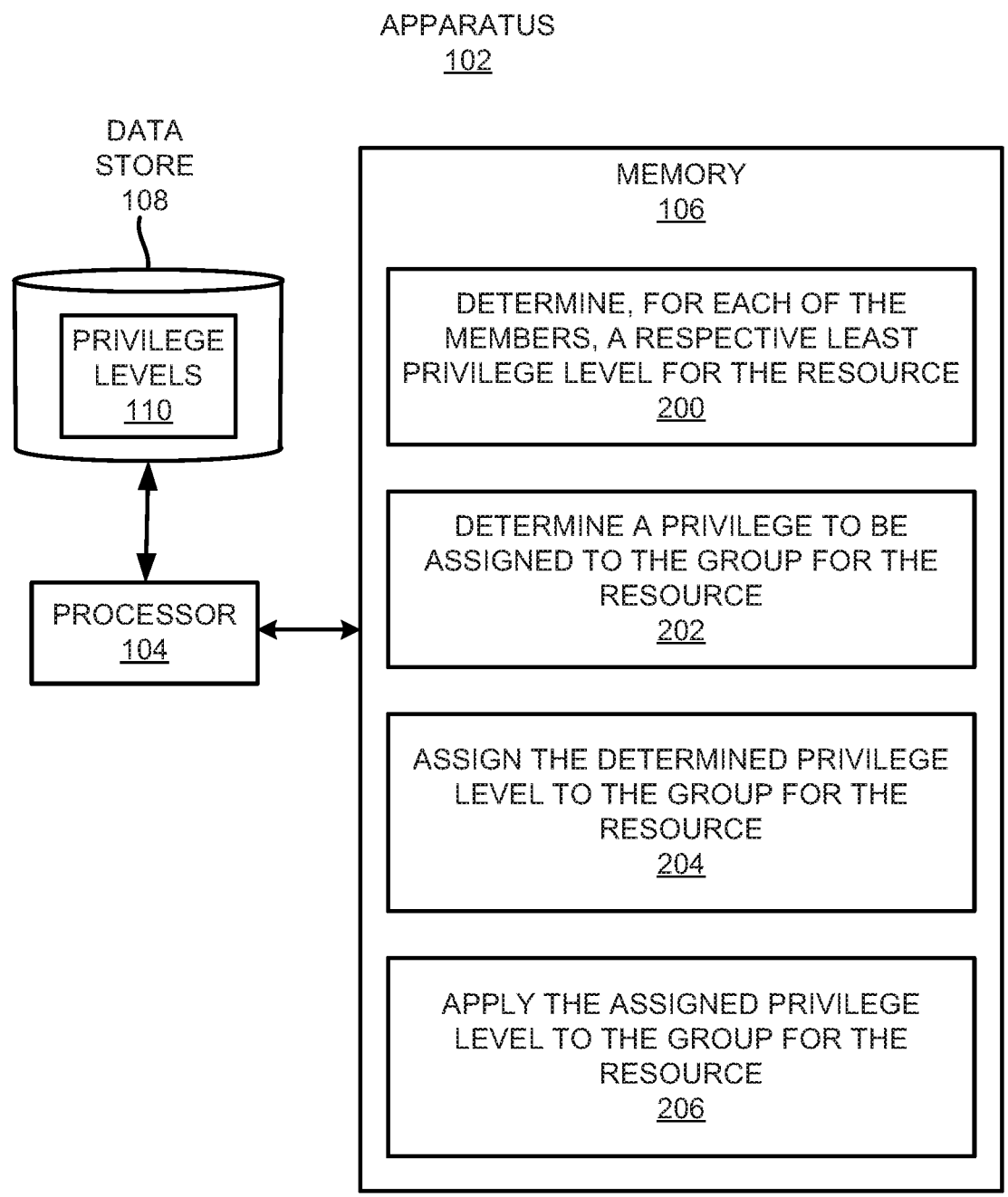
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may manage privilege levels assigned to a group 120 of members 122A-122N, in accordance with an embodiment of the present disclosure. FIG. 2 depicts a block diagram of the apparatus 102 depicted in FIG. 1, in accordance with an embodiment of the present disclosure. It should be understood that the network environment 100 and the apparatus 102 of the network environment 100 may include additional features and that some of the features described herein may be removed and/or modified without departing from the scopes of the network environment 100 and/or the apparatus 102.

As shown in FIG. 1, the network environment 100 may include the apparatus 102, a plurality of members 122A-122N, resources 130A, 130B, and a network 140. According to examples, the apparatus 102 may be a server or other type of computing device, e.g., a network gateway, an access point, or the like, that may provide administrative services to the members 122A-122N, in which the variable "N" may represent a value greater than 1. In some examples, each of the members 122A-122N may be a separate computing device, such as a personal computer, a laptop computer, a tablet computer, a smartphone, a handheld scanning device, or the like. In other examples, each of the members 122A-122N may be a different user, user account, service, application, or the like. For instance, the first member 122A may represent a first user account that is logged into a first computing device, the second member 122B may represent a first service executing a second computing device, etc. As such, for instance, a user may log into different computing devices using a user account at different times and may thus be a member 122A on different computing devices at different times. Likewise, different services may be executing on different computing devices and may access the resources 130A and 130B during the execution of the services.

As also shown, the members 122A-122N may be part of a group 120. Generally speaking, the group 120 may be defined as a collection of principals or members, e.g., users, user accounts, terminals, computing devices, services, applications, or the like, that may share a common feature and/or function. By way of example, a group may include members (e.g., user accounts of employees) of a business organization that work in a common department, for instance, the employees in a finance department, an IT department, a facilities management department, a sales department, a marketing department, or the like. As another example, a group may include members of an educational institution, for instance, the faculty in the math department, the faculty in the English department, or the like. In any regard, an administrator of an organization or other personnel may define the criteria for inclusion in the group 120 and may determine which members 122A-122N are to be included in the group 120. As a further example, a group may include services that are to perform similar types of operations for a department in an organization or institution.

Although each of the members 122A-122N has been depicted as being included in the group 120, it should be understood that at least one of the members 122A-122N may be outside of the group 120. Additionally, although a single group 120 has been depicted in FIG. 1, it should be understood that any number of groups may be included in the network environment 100 depicted in FIG. 1. Likewise, although two resources 130A and 130B are depicted, it should be understood that the network environment 100 may include any number of resources.

As further shown in FIG. 1, the apparatus 102 may communicate with each of the members 122A-122N via a network 140, which may be any suitable type of network through which the members 122A-122N, e.g., the computing devices on which the members 122A-122N are logged in, are executing, etc., and the apparatus 102 may communicate with each other, such as the Internet, a wide area network, a local area network, and/or the like. In addition, the members 122A-122N may communicate with the resources 130A and 130B via the network 140. The resources 130A and 130B may each be a server, a service, a virtual machine, a data store, a data store, and/or the like.

As discussed herein, the group 120 may be assigned a privilege level, which may also be referenced as a permission level, a role, or the like, to a first resource 130A and a privilege level to the second resource 130B. The privilege levels assigned to the group 120 may be the same or may differ for each of the first resource 130A and the second resource 130B. As also discussed herein, the apparatus 102, and more particularly, the processor 104, may assign and/or modify an assigned privilege level to the group 120 for the first resource 130A and the privilege level for the second resource 130B. The privilege level may be assigned based on a type of access that the members 122A-122N of the group 120 are to have over the first resource 130A and/or the second resource 130B, e.g., the files, documents, data, and/or the like, stored on the first resource 130A. For instance, a first group, e.g., a finance group, may be assigned a higher privilege level to the first resource 130A than a second group, e.g., a sales group, because the members in the first group may normally manipulate the data provided by the first resource 130A whereas the members in the second group may normally read the data provided by the first resource 130A.

The types of access may include, for instance, a contributor type, a writer type, a reader type, a limited reader type, a limited writer type, and/or the like. A group 120 that has been assigned the contributor type of access may enable the members 122A-122N of the group 120 to have a highest level of access to the data associated with a resource 130A. Thus, for instance, a group 120 that has been assigned with the contributor type of access may enable the members 122A-122N of the group 120 to read, write, copy, delete, modify, etc., the data. A group 120 that has been assigned with the writer type of access may enable the members 122A-122N of the group 120 to read and write the data. A group 120 that has been assigned with the reader type of access may enable the members 122A-122N to read the data without being able to write, e.g., modify, the data.

As shown in FIG. 1, the apparatus 102 may include a data store 108 on which assigned privilege levels 110 of a plurality of groups, including the group 120, may be stored. The data store 108 may be a Random Access memory (RAM), an Electrically Erasable Programmable Read-Only Memory (EEPROM), a storage device, or the like. The privilege levels may be assigned to the groups such that, for instance, when new members are added to an organization and/or when members change groups, the members may be assigned the same privilege level as other members of the group, which may simplify assignment of privilege levels to the members. The assigned privilege levels may also be enforced such that, for instance, access by the members of the groups to the resources may be restricted to their assigned privilege levels. For instance, the apparatus 102 may employ role-based access control over the members 122A-122N.

According to examples, and as discussed herein, the apparatus 102 may manage the privilege level assigned to a group 120 for a resource 130A such that, for instance, the group 120 may be assigned an appropriate privilege level for the resource 130A. That is, for instance, the apparatus 102 may manage the privilege level assigned to the group 120 for the resource 130A such that the group 120 may be assigned a least privilege level, e.g., a minimal privilege level, that may enable the members 122A-122N of the group 120 to normally perform their intended duties. The apparatus 102 may also apply the assigned least privilege level to the group 120 such that the members 122A-122N of the group 120 may be prevented from having access (e.g., read access, write access, etc.) to the data associated with the resource 130A that exceeds the assigned least privilege level. By assigning and applying the least privilege level to the group 120, access to the data associated with the resource 130A may be better restricted, which may enhance security of the resources 130A.

As shown in FIGS. 1 and 2, the apparatus 102 may include a processor 104 that may control operations of the apparatus 102. The apparatus 102 may also include a memory 106 on which data that the processor 104 may access and/or may execute may be stored. The processor 104 may be a semiconductor-based microprocessor, a central processing unit (CPU), an application specific integrated circuit (ASIC), a field-programmable gate array (FPGA), and/or other hardware device. The memory 106, which may also be termed a computer readable medium, may be, for example, a Random Access memory (RAM), an Electrically Erasable Programmable Read-Only Memory (EEPROM), a storage device, or the like. The memory 106 may be a non-transitory computer readable storage medium, where the term "non-transitory" does not encompass transitory propagating signals. In any regard, the memory 106 may have stored thereon machine-readable instructions that the processor 104 may execute.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

As shown in FIG. 2, the memory 106 may have stored thereon machine-readable instructions 200-206 that the processor 104 may execute. Although the instructions 200-206 are described herein as being stored on the memory 106 and may thus include a set of machine-readable instructions, the apparatus 102 may include hardware logic blocks that may perform functions similar to the instructions 200-206. For instance, the processor 104 may include hardware components that may execute the instructions 200-206. In other examples, the apparatus 102 may include a combination of instructions and hardware logic blocks to implement or execute functions corresponding to the instructions 200-206. In any of these examples, the processor 104 may implement the hardware logic blocks and/or execute the instructions 200-206. As discussed herein, the apparatus 102 may also include additional instructions and/or hardware logic blocks such that the processor 104 may execute operations in addition to or in place of those discussed above with respect to FIG. 2.

The processor 104 may execute the instructions 200 to determine, for each of the members 122A-122N of the group 120, a respective least privilege level for a resource 130A. That is, for instance, the processor 104 may determine, for each of the member 122A-122N, a least or lowest privilege level that the member may need to perform their normal duties or functions. By way of example, the processor 104 may determine that a first member 122A may normally read data associated with, e.g., stored by, under the control of, or the like, the resource 130A and that a second member 122B may normally write data associated with the resource 130A. Thus, for instance, the processor 104 may determine that the least privilege level that the first member 122A may need for the resource 130A is a read type of privilege level and that the least privilege level that the second member 122B may need for the resource 130B is a write type of privilege level.

The processor 104 may determine the respective least privilege levels for the resource 130A through implementation of any suitable algorithm or technique. For instance, the processor 104 may determine, for each of the members 122A-122N, historical usage of the resource 130A, e.g., the type of access that the members 122A-122N used on the resource 130A. The processor 104 may review logs or other data that may show the historical usage over a certain period of time, e.g., the past month, the past three months, and/or the like, etc. By way of example, the processor 104 may determine that the least privilege level for the first member 122A may be a read privilege level based on a determination that the first member 122A did not perform any write operations of the data associated with the resource 130A during the time period at which the historical usage was analyzed. In any regard, the processor 104 may determine the respective least privilege levels of the members 122A-122N for the resource 130A based on the historical usages of the resource 130A.

The processor 104 may execute the instructions 202 to determine, based on the determined respective least privilege levels, a privilege level to be assigned to the group 120 for the resource 130A. For instance, the processor 104 may determine the least privilege level for which a majority of the members 122A-122N are determined to have. In this example, the processor 104 may determine the privilege level to be assigned to the group 120 to correspond to the determined least privilege level for which the majority of the members 122A-122N are determined to have.

The processor 104 may execute the instructions 204 to assign the determined privilege level to the group 120 for the resource 130A. That is, for instance, the processor 104 may store the assignment of the determined privilege level to the group 120 for the resource 130A in the data store 108. In addition, the processor 104 may execute the instructions 206 to apply the assigned privilege level to the group 120 for the resource 130A. That is, for instance, the processor 104 may control or otherwise cause the level and/or type of access that the members 122A-122N of the group 120 may have over the resource 130A to be restricted to the applied permission level. By way of example, the processor 104 may directly control how the members 122A-122N may access and/or manipulate data associated with the resource 130A. As another example, the processor 104 may direct or otherwise cause the resource 130A to enforce the level and/or type of access that the members 122A-122N may have over the resource 130A.

According to examples, the processor 104 may determine whether any of the members 122A-122N have a least privilege level that is lower than the assigned privilege level of the group 120. In these examples, the processor 104 may identify those members 122A and may assign a least privilege level to the identified member 122A or members that is lower than the privilege level assigned to the group 120 for the resource 130A. In addition, the processor 104 may apply the lower least privilege level to the identified member 122A or members for the resource 130A.

According to examples, the processor 104 may determine whether any of the members 122A-122N of the group 120 has a determined least privilege level that exceeds the assigned privilege level to the group 120 for the resource 130A. In these examples, the processor 104 may assign a privilege level that is higher than the privilege level assigned to the group 120 for the resource 130A. In addition, the processor 104 may assign and apply the higher least privilege level to the members of the group for the resource determined to have a determined least privilege level that exceeds the different privilege level assign to the group.

In some examples, the processor 104 may determine a number of the members 122A-122N having determined least privilege levels that are lower than the assigned privilege level of the group 120 for the resource 130A. In these examples, the processor 104 may determine whether the determined number exceeds a predetermined value. The predetermined value may be user-defined and/or may be based, for instance, on an intended security level of the resource 130A. Based on the determined number of the members 122A-122N having determined least privilege levels that fall below the predetermined value, the processor 104 may partition the group 120 into a first sub-group and a second sub-group. In addition, the processor 104 may assign the determined privilege level to the first sub-group and may assign a different, e.g., lower or higher, privilege level to the second sub-group. The processor 104 may also assign members of the group 120 having a determined least privilege level that meets or exceeds the assigned privilege level to the first sub-group and may assign members of the group having a determined least privilege level that is below the assigned privilege level to the second sub-group. The processor 104 may further store the assignments of the members of the group 120 in the data store 108.

In some examples, the processor 104 may determine whether the sub-groups of the group 120 are to be further partitioned, for instance, based on a determined number of the members 122A-122N in the sub-groups. That is, the processor 104 may determine whether a sub-group is to be further partitioned into descendent sub-groups in manners similar to those discussed above with respect to determining whether the group 120 is to be partitioned into the sub-groups. The processor 104 may also determine that the descendent sub-groups may be further partitioned in similar manners until, for instance, the processor 104 determines that no further partitions are to be made.

The partitioning of the group 120, sub-groups, and descendent sub-groups, may add complexity to the assignment of privilege levels to the group 120, sub-groups, and descendent sub-groups, especially as the levels of descendent sub-groups increases. In some examples, the processor 104 may determine whether partitioning the group 120, a sub-group, a descendent sub-group, and/or the like, would exceed a complexity threshold, and may partition the group 120 into the first sub-group and the second sub-group, may partition a sub-group into descendent sub-groups, etc., based on a determination that the partitioning would not exceed the complexity threshold. The complexity threshold may be user-defined and may be based on any suitable parameters, such as available processing resources, number of members, number of groups, number of descendent sub-groups, and/or the like. Thus, for instance, the processor 104 may not partition a group, a sub-group of the group, a descendent sub-group, etc., based on a determination that the number of sub-groups and/or descendant sub-groups exceeds a certain threshold number. In instances in which the processor 104 determines that partitioning the group 120, the sub-group, the descendent sub-group, etc., would likely exceed the complexity threshold, the processor 104 may not partition the group 120, the sub-group, the descendent sub-group, etc.

According to examples, the processor 104 may determine whether the group 120 is to be assigned a privilege level for the second resource 130B. That is, the processor 104 may determine, for each of the members, a respective least privilege level for the second resource 130*b*. The processor 104 may also determine, based on the determined respective least privilege levels for the second resource 130B, a second privilege level to be assigned to the group 120 for the second resource 130B. The processor 104 may further assign the determined second privilege level to the group 120 for the second resource 130B and may apply the assigned second privilege level to the group 120 for the second resource 130B. The processor 104 may still further partition the group 120 and/or assign lower or higher privilege levels to some of the members 122A-122N for the second resource 130B in manners similar to those discussed herein with respect to the first resource 130A.

According to examples, the processor 104 may determine whether the assigned privilege level to the group 120 for the resource 130A is to be modified. In these examples, the processor 104 may determine a number of the members 122A-122N that have least privilege levels that are lower than the assigned privilege level of the group 120 for the resource 130A. That is, for instance, the processor 104 may determine whether the assigned privilege level of the group 120 is to be modified based on a number of the members 122A-122N having least privilege levels that are lower than the assigned privilege level of the group 120. The number of the members 122A-122N may correspond to any suitable number, e.g., a total number, a percentage value of the total number of members 122A-122N in the group 120, or the like.

The processor 104 may also determine whether the determined number of the members 122A-122N that have least privilege levels that are lower than the assigned privilege level of the group exceeds a predefined threshold value. The predefined threshold level may be user-defined and may be set based on, for instance, an intended security level associated with the group 120 and/or the resource 130A. Thus, for instance, the predefined threshold level may be set to a lower level in instances in which a higher level of security is intended and to a higher level in instances in which a lower level of security is intended. By way of example in which a higher level of security is intended, by setting the predefined threshold level to a lower number, the privilege level assigned to the group 120 may more likely be reduced.

The processor 104 may, based on the determined number exceeding the predefined threshold value, determine that the assigned privilege level of the group is to be modified. In an example in which the predefined threshold value is 60%, the processor 104 may determine that the determined number exceeds the predefined threshold value based on 60% or greater of the members 122A-122N having least privilege levels that fall below the assigned privilege level of the group 120. In other examples, the processor 104 may determine that the assigned privilege value of the group is not to be modified based on a determination that the determined number falls below the predefined threshold value.

The processor 104 may, based on a determination that the privilege level of the group 120 is to be modified, assign and store a different privilege level to the group 120 for the resource 130A. That is, the processor 104 may assign a lower privilege level to the group 120 for the resource 130A. In some examples, the lower privilege level may correspond to the determined respective least privilege levels of the members 122A-122N. For instance, the lower privilege level may be equivalent to a majority (or some other number) of the determined respective least privilege levels of the members 122A-122N for the resource 130A. Thus, in an example in which the assigned privilege level is a contributor level, the processor 104 may modify the assigned privilege level to a reader or a writer level. The processor 104 may also store the assigned different privilege level in the data store 108 and may apply the assigned different privilege level of the members 122A-122N for the resource 130A.

According to examples, the processor 104 may determine whether any of the members 122A of the group 120 has a determined least privilege level that exceeds the different privilege level, e.g., lower privilege level, assigned to the group 120. In these examples, the processor 104 may implement an exception for those members 122A of the group 120 having determined least privilege levels that exceeds the different privilege level. That is, the processor 104 may exempt those members 122A from being assigned the different privilege level. Instead, those members 122A may be assigned the determined privilege level, e.g., the initially assigned privilege level of those members 122A may not be modified. In addition, the processor 104 may store the assigned privilege level of those members 122A in the data store 108 and may apply the assigned privilege level of those members 122A for the resource 130A.

However, based on a determination that the determined number of the members 122A-122N having least privilege levels that are lower than the assigned privilege level of the group 120 falls below the predefined threshold value, the processor 104 may determine that the assigned privilege level of the group 120 for the resource 130A is not to be modified. In addition, the processor 104 may not modify the assigned privilege level of the group 120 for the resource 130A. In these examples, the processor 104 may identify a member 122A (or members) of the group 120 having a determined least privilege level that falls below the assigned privilege level of the group 120 for the resource 130A. The processor 104 may also assign and store the determined least privilege level to the identified member 122A (or members) of the group 120 for the resource 130A. As a result, the member(s) 122A that have determined least privilege levels that fall below the assigned privilege level of the group 120 for the resource 130A may be assigned lower privilege levels, which may enhance security of the resource 130A.

In some examples, the processor 104 may determine a number of the members 122A-122N having determined least privilege levels that are lower than the assigned privilege level of the group. In these examples, the processor 104 may determine whether the determined number exceeds a predetermined value. The predetermined value may be user-defined and may be based, for instance, on an intended security level of the resource 130A. Based on the determined number of the members 122A-122N having determined least privilege levels that fall below the predetermined value, the processor 104 may partition the group 120 into a first sub-group and a second sub-group. In addition, the processor 104 may assign the privilege level assigned to the group 120, e.g., the initially assigned privilege level, to the first sub-group and may assign the different privilege level, e.g., the modified privilege level, to the second sub-group. The processor 104 may also assign members of the group 120 having a determined least privilege level that meets or exceeds the assigned privilege level to the first sub-group and may assign members of the group having a determined least privilege level that is below the assigned privilege level to the second sub-group. The processor 104 may further store the assignments of the members of the group 120 in the data store 108.

As discussed herein, the processor 104 may further partition a sub-group into descendent sub-groups. In addition, the processor 104 may determine whether partitioning the group 120, a sub-group, a descendent sub-group, etc., would exceed a complexity threshold, and may partition the group 120 into the first sub-group and the second sub-group, partition the sub-group, partition the descendent sub-group, etc., based on a determination that the partitioning would not exceed the complexity threshold. The complexity threshold may be user-defined and may be based on any suitable parameters, such as available processing resources, number of members, number of groups, number of descendent sub-groups, and/or the like. In instances in which the processor 104 determines that partitioning the group 120, the sub-group, the descendent sub-group, etc., would likely exceed the complexity threshold, the processor 104 may not partition the group 120, the sub-group, the descendent sub-group, etc.

According to examples, the processor 104 may determine whether the privilege level of the group 120 for the second resource 130B is to be modified. That is, the processor 104 may identify a second privilege level assigned to the group 120 for a second resource 130B and may determine, for each of the members 122A-122B of the group, a respective least privilege level for the second resource 130B. The processor 104 may also determine, based on the determined respective least privilege levels, whether the assigned privilege level of the group 120 is to be modified for the second resource 130B and based on a determination that the privilege level of the group 120 is to be modified for the second resource 130B, assign and store a different privilege level to the group 120 for the second resource 130B. The processor 104 may further determine whether any of the members 122A-122N are to have least privilege levels that differ from the privilege level assigned to the group 120 in manners similar to those discussed herein with respect to the first resource 130A.

Various manners in which the processor 104 of the apparatus 102 may operate are discussed in greater detail with respect to the method 300 depicted in FIGS. 3A-3D. Particularly, FIGS. 3A-3D, collectively, depict a flow diagram of a method 300 for determining whether an assigned permission level of a group 120 of members 122A-122N is to be modified and to assigning a different permission level to the group 120 based on the determination, in accordance with an embodiment of the present disclosure. It should be understood that the method 300 depicted in FIGS. 3A-3D may include additional operations and that some of the operations described therein may be removed and/or modified without departing from the scope of the method 300. The description of the method 300 is made with reference to the features depicted in FIGS. 1 and 2 for purposes of illustration.

Figure 3A:
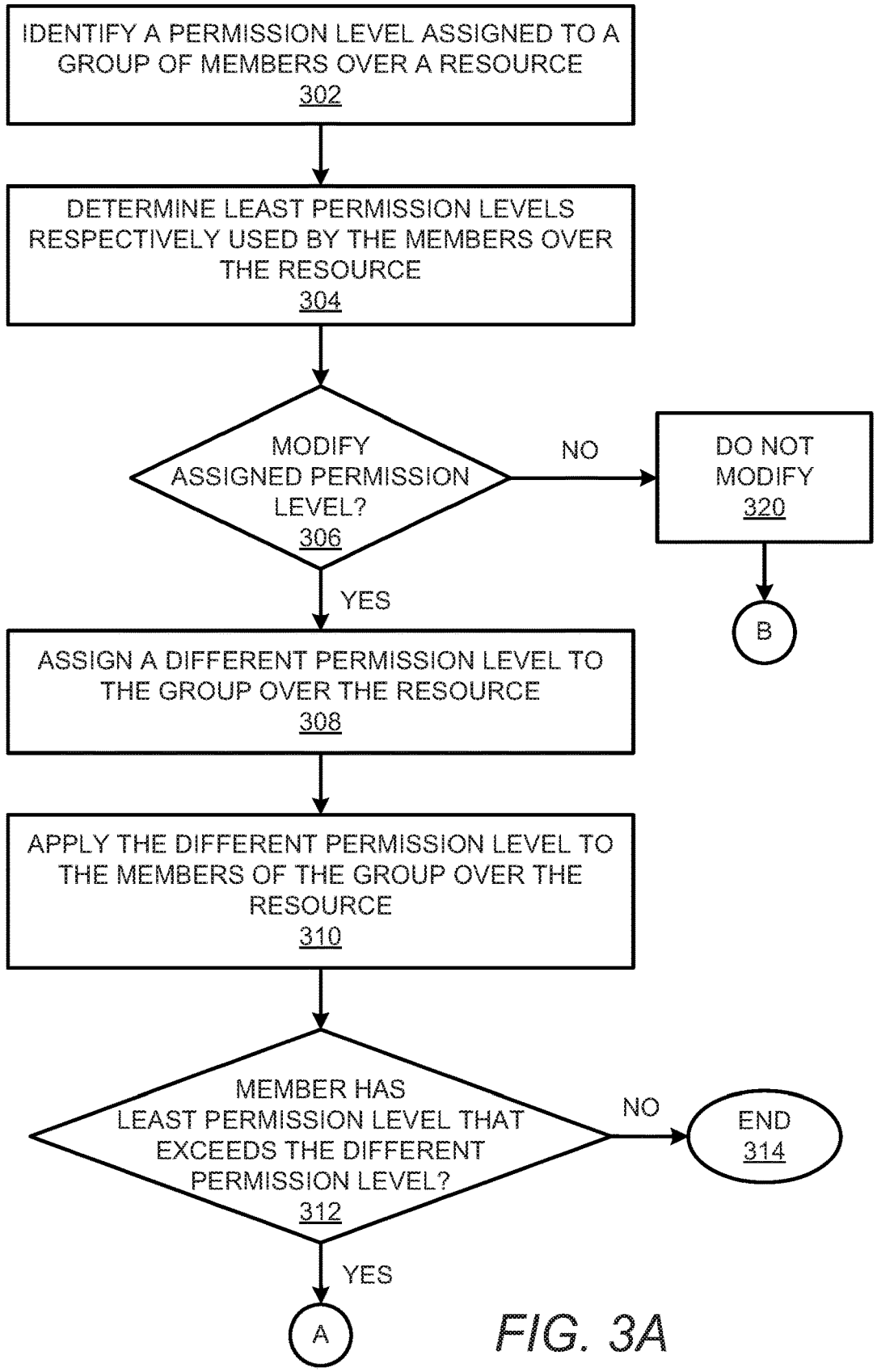
FIGS. 3A-3D, collectively, depict a flow diagram of a method for determining whether an assigned permission level of a group of members is to be modified and to assigning a different permission level to the group based on the determination, in accordance with an embodiment of the present disclosure.
Figure 3B:
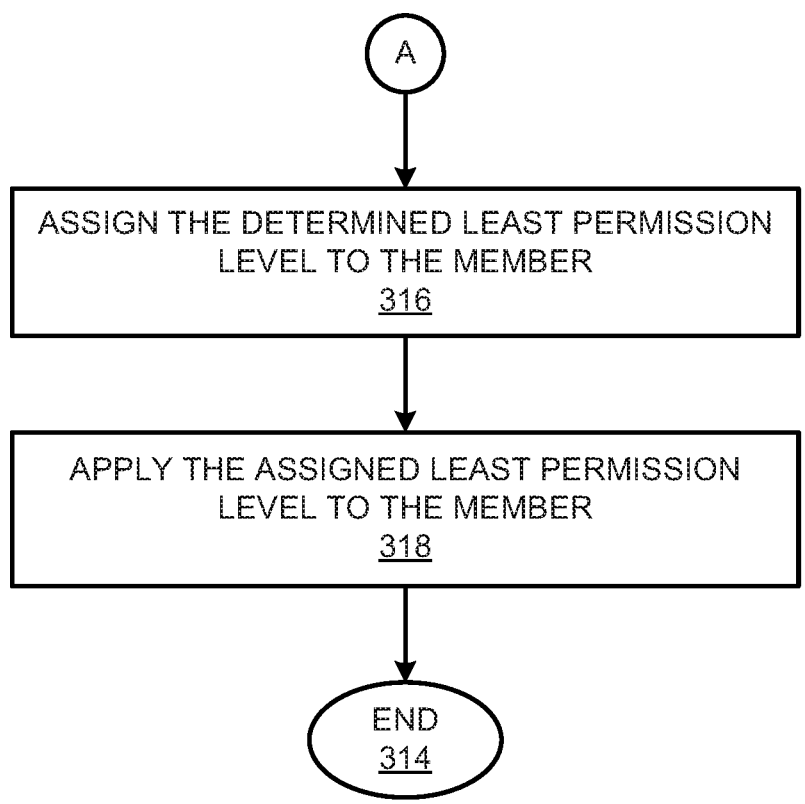
Figure 3C:
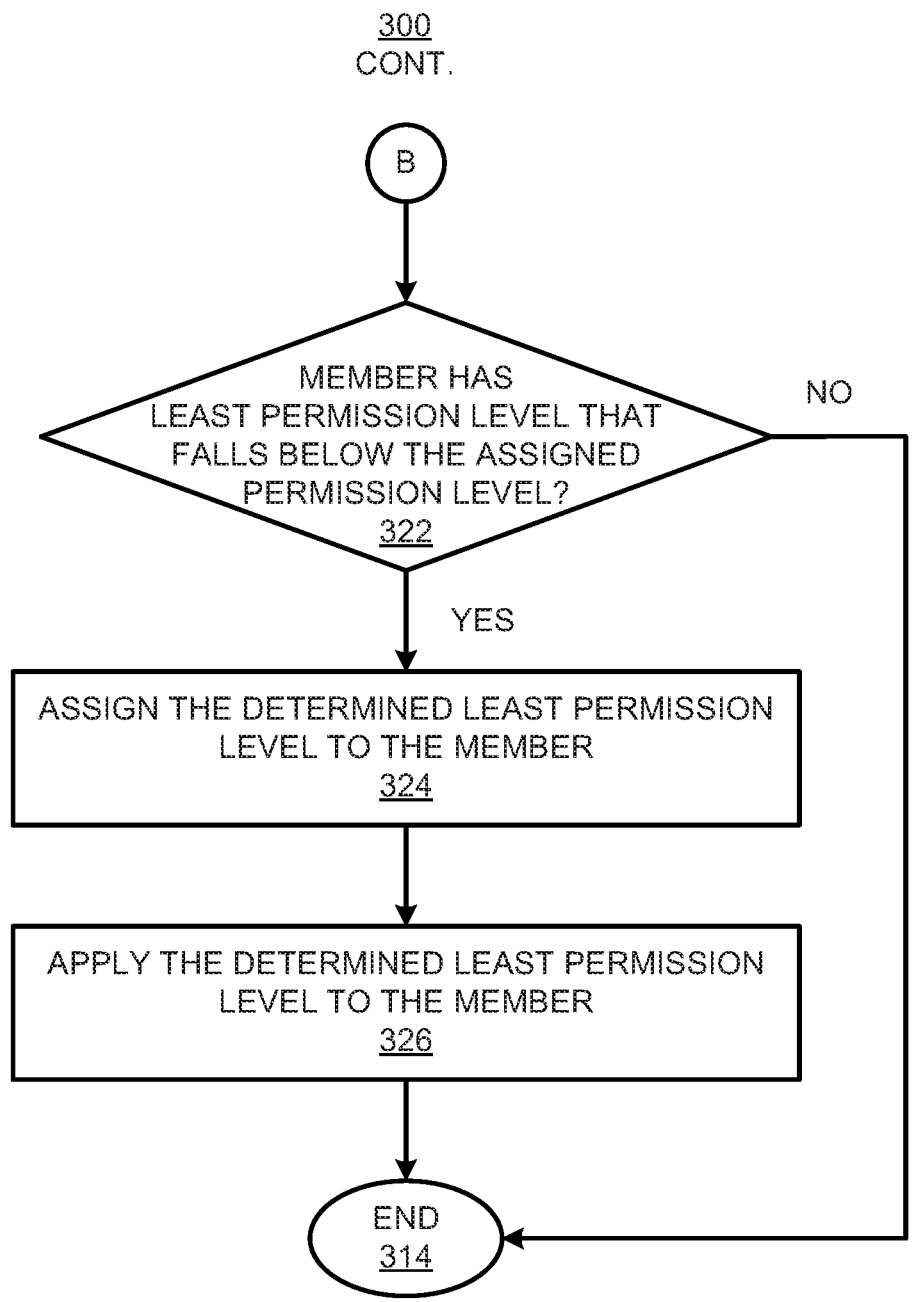
Figure 3D:
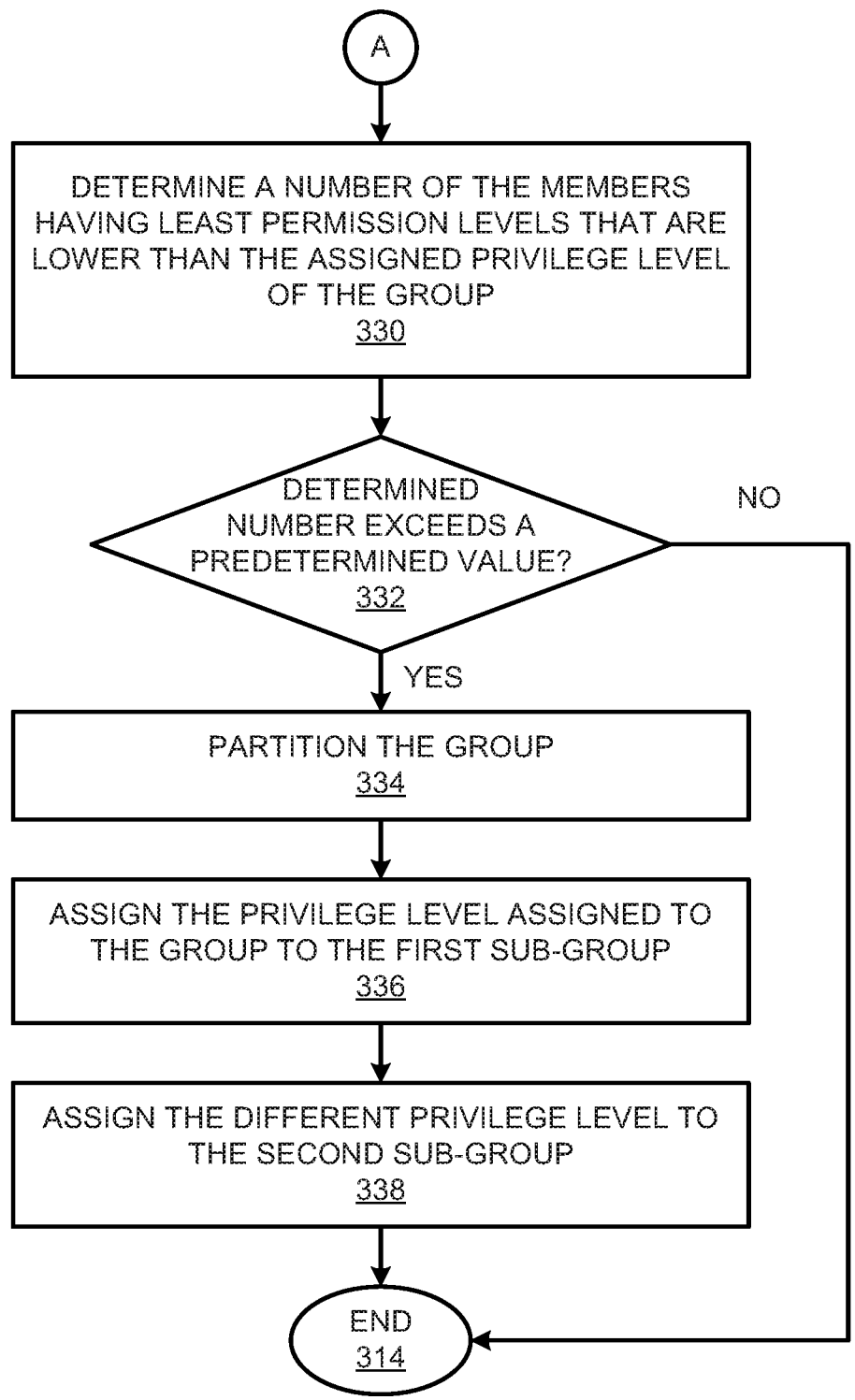

With reference first to FIG. 3A, at block 302, the processor 104 may identify a permission level assigned to a group 120 of members 122A-122N over a resource 130A. The permission level may be equivalent to the privilege level discussed elsewhere herein as well as to a role or other equivalent term.

At block 304, the processor 104 may determine least permission levels respectively used by the members 122A-122N over the resource 130A over a predefined time period. In addition, at block 306, the processor 104 may determine whether the assigned permission level of the group 120 over the resource 130A is to be modified based on the determined least permission levels. For instance, the processor 104 may determine a number of the members 122A-122N that have used least permission levels over the resource 130A over the predefined time period that are lower than the assigned permission level of the group 120 over the resource 130A. The processor 104 may also determine whether the determined number exceeds a predefined threshold value and based on the determined number exceeding the predefined threshold value, determine that the assigned permission level of the group 120 over the resource 130A is to be modified.

At block 308, the processor 104 may assign a different permission level to the group 120 over the resource 130A based on a determination that the assigned permission level is to be modified. The processor 104 may also store the assigned different permission level in the data store 108. At block 310, the processor further apply the different permission level to the members 122A-122N of the group 120 over the resource 130A. That is, for instance, the processor 104 may control or otherwise cause the level and/or type of access that the members 122A-122N may have over the resource 130A to be restricted to the different permission level. By way of example, the processor 104 may directly control how the members 122A-122N may access and/or manipulate data associated with the resource 130A. As another example, the processor 104 may direct or otherwise cause the resource 130A to enforce the level and/or type of access that the members 122A-122N may have over the resource 130A.

In some examples, at block 312, the processor 104 may determine whether any of the members 122A-122N of the group 120 has a determined least permission level that exceeds the different permission level assigned to the group 120 over the resource 130A. In these examples, at block 314, the processor 104 may end the method 300 based on a determination that none of the members has a determined least permission level over the resource 130A that exceeds the different permission level assigned to the group 120 over the resource 130A.

However, based on at least one of the members 122A-122N having a determined least permission level that exceeds the different permission level assigned to the group 120 over the resource 130A, at block 314 (FIG. 3B), the processor 104 may assign the determined least permission level to the members of the group 120 determined to have a determined least permission level that exceeds the different permission level assigned to the group 120 over the resource 130A. In addition, at block 318, the processor 104 may apply the assigned least permission level to the members of the group 120 determined to have a determined least permission level that exceeds the different permission level assigned to the group 120 over the resource 130A. The method 300 may also end at block 314 following block 318.

With reference back to FIG. 3A, based on the determined number falling below the predefined threshold value at block 306, the processor 104 may determine that the assigned permission level of the group 120 over the resource 130A is not to be modified as indicated at block 320. In some examples, the processor 104 may, at block 322 (FIG. 3C), determine whether any of the members 122A-122N of the group 120 has a least permission level that falls below the assigned permission level of the group 120 over the resource 130A. Based on a determination that at least one of the members has a least permission level that falls below the assigned permission level of the group 120 over the resource 130A, the processor 104 may identify those members and at block 324, may assign the determined least permission level to the identified member or members. In addition, at block 326, the processor 104 may apply the assigned least permission level to the identified member or members.

However, based on a determination that none of the members 122A-122N of the group 120 has a least permission level that falls below the assigned permission level of the group 120 over the resource 130A, the processor 104 may end the method 300 at block 314.

According to examples, based on a determination at block 312 that at least one of the members 122A-122N of the group 120 has a determined least permission level that exceeds the different permission level assigned to the group 120 over the resource 130A, at block 330 (FIG. 3D), the processor 104 may determine a number of the members having a least permission level that is lower than the assigned permission level of the group 120 over the resource 130A. At block 332, the processor 104 may determine whether the determined number of the members at block 330 exceeds a predetermined value.

In addition, at block 334, the processor 104 may, based on the determined number falling below the predetermined value, partition the group 120 into a first sub-group and a second sub-group. The processor 104 may also assign (block 336) the permission level assigned to the group 120 to the first sub-group and assign (block 338) the different permission level to the second sub-group. The processor 104 may also assign members of the group 120 having a determined least permission level that meets or exceeds the assigned permission level to the first sub-group and may assign members of the group 120 having a determined least permission level that is below the assigned permission level to the second sub-group. The processor 104 may further apply and/or enforce the assigned permission levels upon the members in each of the respective sub-groups. The processor 104 may still further end (block 314) the method 300.

In some examples, prior to partitioning the group 120 at block 334 or partitioning a sub-group into descendent sub-groups, etc., the processor 104 may determine whether partitioning the group, the sub-group, etc., would exceed a complexity threshold as discussed herein. In addition, the processor 104 may partition the group into the first sub-group and the second sub-group, a sub-group into descendent sub-groups, etc., based on a determination that the partitioning would not exceed the complexity threshold. However, the processor 104 may not partition the group, the sub-group, the descendent sub-group, etc., based on a determination that the partitioning would exceed the complexity threshold.

With reference back to block 332, based on a determination that the number of the members determined at block 330 does not exceed the predetermined value, the processor 104 may end the method 300. Following the ending of the method 300 at block 314, the processor 104 may implement the method 300 again for the group 120 over another resource 130B and/or for another group 120 over the resource 130A. The processor 104 may repeat the method 300 in this manner for any additional combinations of groups 120 and resources.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
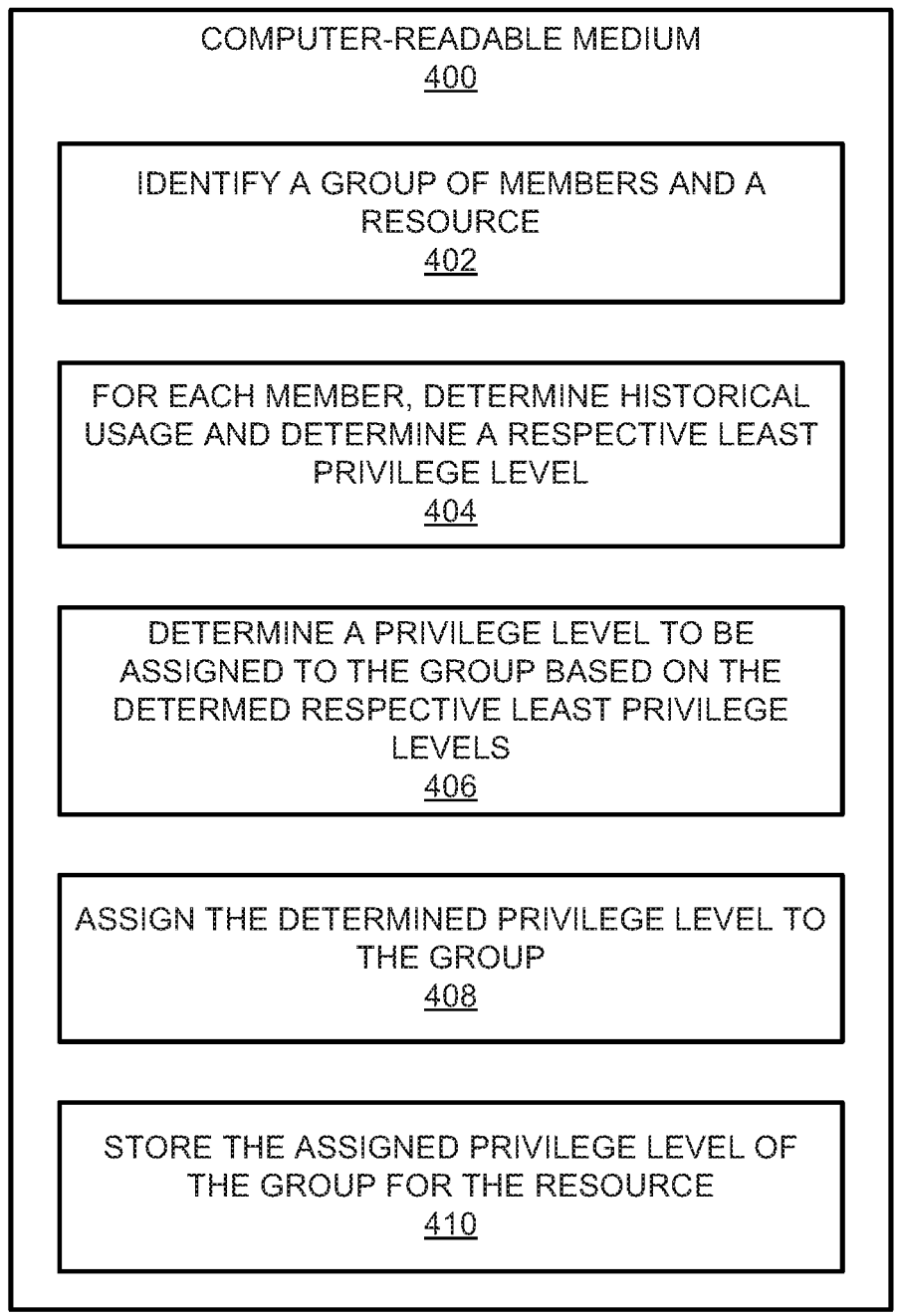
FIG. 4 depicts a block diagram of a computer-readable medium that may have stored thereon for assigning a privilege level to a group of members for a resource, in accordance with an embodiment of the present disclosure.

Turning now to FIG. 4, there is shown a block diagram of a computer-readable medium 400 that may have stored thereon computer-readable instructions for assigning a privilege level to a group 120 of members 122A-122N for a resource 130A, in accordance with an embodiment of the present disclosure. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium, in which the term "non-transitory" does not encompass transitory propagating signals.

The computer-readable medium 400 may have stored thereon computer-readable instructions 402-410 that a processor, such as the processor 104 depicted in FIGS. 1 and 2, may execute. The computer-readable medium 400 may be an electronic, magnetic, optical, or other physical storage device that contains or stores executable instructions. The computer-readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to identify a group 120 of members 122A-122N and a resource 130A. That is, the processor may identify a group 120 of members 122A-122N for which a privilege level of the group 120 is to be determined for a resource 130A. The processor may fetch, decode, and execute the instructions 404 to, for each of the members 122A-122N of the group 120, determine historical usage of the resource 130A and determine a respective least privilege level for the resource 130A based on the determined historical usage. The processor may fetch, decode, and execute the instructions 406 to determine, based on the determined respective least privilege levels, a privilege level to be assigned to the group 120 for the resource 130A. The processor may determine the privilege level to be assigned to the group 120 as corresponding to, for instance, a majority of the determined respective least privilege levels. The processor may fetch, decode, and execute the instructions 408 to assign the determined privilege level to the group 120 for the resource 130A. The processor may further fetch, decode, and execute the instructions 410 to store the assigned privilege level of the group for the resource.

According to examples, the processor may fetch, decode, and execute additional instructions to determine a number of the members 122A-122N having least privilege levels that are lower than the assigned privilege level of the group 120 for the resource 130A, determine whether the determined number exceeds a predefined threshold value, and based on the determined number exceeding the predefined threshold value, determine that the assigned privilege level of the group 120 is to be modified. In addition or alternatively, the processor may fetch, decode, and execute additional instructions to identify a member 122A of the group 120 having a determined least privilege level that falls below the assigned privilege level of the group 120 and may assign and store the determined least privilege level to the identified member 122A. In addition or alternatively, the processor may fetch, decode, and execute additional instructions to determine whether any of the members 122A of the group 120 has a determined least privilege level that exceeds the assigned privilege level of the group 120 for the resource 130A and may assign and store the determined least privilege level to the members 122A of the group 120 determined to have a determined least privilege level that exceeds the assigned privilege level of the group 120 for the resource 130A.

In yet other examples, the processor may fetch, decode, and execute additional instructions to determine a number of the members 122A-122N having least privilege levels that are lower than the assigned privilege level of the group 120 for the resource 130A. In these examples, the processor may also determine whether the determined number exceeds a predetermined value and based on the determined number falling below the predetermined value, may partition the group into a first sub-group and a second sub-group. The processor may further assign a first privilege level to the first sub-group and may assign a second privilege level to the second sub-group. The processor may assign the members 122A-122N into the respective sub-groups based on their determined least privilege levels for the resource 130A. The processor may further partition the first sub-group into descendent sub-groups as discussed herein. Additionally, the processor may partition the group and/or the sub-group (as well as any other descendent sub-groups) based on a determination that such partitioning would not result in a complexity threshold being exceeded.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that cause the processor to:
   determine an assigned privilege level of a specific group of a plurality of members for accessing data on a first resource, the assigned privilege level being a highest access level that each member in the specific group is assigned to access the data on the first resource;
   determine privilege levels used by each of the members in the specific group to access the data on the first resource over a predefined time period;
   determine a count of the members in the specific group who used privilege levels that are lower than the assigned privilege level of the specific group;
   determine whether the determined count of the members who used the privilege levels that are lower than the assigned privilege level of the specific group exceeds a threshold value; and
   based on the determined count exceeding the threshold value, modify the assigned privilege level of the specific group to a privilege level that is lower than assigned privilege level.

2. The apparatus of claim 1, wherein the instructions cause the processor to:
   determine, for each of the members in the specific group, historical usage of the first resource; and
   determine the assigned privilege level of each of the members in the specific group based on the determined historical usage of the first resource.

3. The apparatus of claim 1, wherein the instructions cause the processor to:
based on a determination that the determined count does not exceed the threshold value, determine that the assigned privilege level of the specific group is not to be modified;
identify a member of the specific group that used a privilege level that is lower than the assigned privilege level of the specific group;
assign the privilege level that is lower than the assigned privilege level of the specific group to the identified member for accessing the first resource; and
apply the privilege level that is lower than the assigned privilege level of the specific group to the identified member for accessing the first resource.

4. The apparatus of claim 1, wherein the instructions cause the processor to:
identify any of the members of the specific group who used a privilege level that exceeds the assigned privilege level of the specific group for accessing the first resource; and
assign and apply the privilege level that exceeds the assigned privilege level of the specific group to the identified members of the specific group for accessing the first resource.

5. The apparatus of claim 1, wherein the instructions cause the processor to:
based on a determination that the determined count does not exceed the threshold value, partition the specific group into a first sub-group and a second sub-group;
assign the assigned privilege level of the specific group to the first sub-group; and
assign the privilege level that is lower than the assigned privilege level to the second sub-group.

6. The apparatus of claim 5, wherein the instructions cause the processor to:
assign members of the specific group who did not use the privilege levels that are lower than the assigned privilege level to the first sub-group; and
assign members of the specific group who used the privilege levels that are lower than the assigned privilege level to the second sub-group.

7. The apparatus of claim 5, wherein the instructions cause the processor to:
determine whether partitioning the specific group would exceed a complexity threshold; and
partition the specific group into the first sub-group and the second sub-group based on a determination that the partitioning would not exceed the complexity threshold.

8. The apparatus of claim 1, wherein the instructions cause the processor to:
determine a privilege level assigned to each of the members in the specific group for usage of a second resource;
determine, based on the determined privilege level assigned to each of the members in the specific group for usage of the second resource, a second privilege level to be assigned to the specific group for usage of the second resource;
assign the determined second privilege level to the specific group for usage of the second resource; and
apply the assigned second privilege level to the specific group for usage of the second resource.

9. A method comprising:
identifying, by a processor, an assigned privilege level of a specific group of a plurality of members for accessing data on a first resource, the assigned privilege level being a highest access level that each member in the specific group is assigned to access the data on the first resource;
determining, by the processor, privilege levels used by each of the members in the specific group to access the data on the first resource over a predefined time period;
determining, by the processor, a count of the members in the specific group who used privilege levels that are lower than the assigned privilege level of the specific group;
determining, by the processor, whether the determined count of the members who used the privilege levels that are lower than the assigned privilege level of the specific group exceeds a threshold value; and
based on the determined count exceeding the threshold value, modifying, by the processor, the assigned privilege level of the specific group to a privilege level that is lower than assigned privilege level.

10. The method of claim 9, further comprising:
based on a determination that the determined count does not exceed the threshold value, determining that the assigned privilege level of the specific group is not to be modified;
identifying a member of the specific group that used a privilege level that is lower than the assigned privilege level of the specific group;
assigning the privilege level that is lower than the assigned privilege level to the identified member; and
applying the assigned lower privilege level to the identified member.

11. The method of claim 9, further comprising:
identifying any of the members of the specific group who used a privilege level that exceeds the assigned privilege level over the first resource; and
assigning the privilege level that exceeds the assigned privilege level to the identified members of the specific group for usage of the first resource.

12. The method of claim 9, further comprising:
based on a determination that the determined count does not exceed the threshold value, partitioning the specific group into a first sub-group and a second sub-group;
assigning the assigned privilege level of the specific group to the first sub-group; and
assigning the privilege level that is lower than the assigned privilege level to the second sub-group.

13. The method of claim 12, further comprising:
assigning members of the specific group who did not use the privilege levels that are lower than the assigned privilege level to the first sub-group; and
assigning members of the specific group who used the privilege levels that are lower than the assigned privilege level to the second sub-group.

14. The method of claim 12, further comprising:
determining whether partitioning the specific group would exceed a complexity threshold; and
partitioning the specific group into the first sub-group and the second sub-group based on a determination that the partitioning would not exceed the complexity threshold.

15. A non-transitory computer-readable medium on which is stored computer-readable instructions that when executed by a processor, cause the processor to:
identify an assigned privilege level of a specific group of a plurality of members for accessing data on a first resource, the assigned privilege level being a highest access level that each member in the specific group is assigned to access the data on the first resource;

determine privilege levels used by each of the members in the specific group to access the data on the first resource over a predefined time period;

determine a count of the members in the specific group who used privilege levels that are lower than the assigned privilege level of the specific group;

determine whether the determined count of the members who used the privilege levels that are lower than the assigned privilege level of the specific group exceeds a threshold value; and based on the determined count exceeding the threshold value, modify the assigned privilege level of the specific group to a privilege level that is lower than assigned privilege level.

16. The non-transitory computer-readable medium of claim 15, wherein the instructions further cause the processor to:

based on a determination that the determined count does not exceed the threshold value, determine that the assigned privilege level of the specific group is not to be modified;

identify a member of the specific group who used a privilege level that is lower than the assigned privilege level of the specific group; and assign and store the privilege level that is lower than the assigned privilege level to the identified member.

17. The non-transitory computer-readable medium of claim 15, wherein the instructions further cause the processor to:

based on a determination that the determined count does not exceed the threshold value, partition the specific group into a first sub-group and a second sub-group;

assign members of the specific group who did not use the privilege levels that are lower than the assigned privilege level to the first sub-group; and assign members of the specific group who used the privilege levels that are lower than the assigned privilege level to the second sub-group.

* * * * *